UNITED STATES PATENT OFFICE.

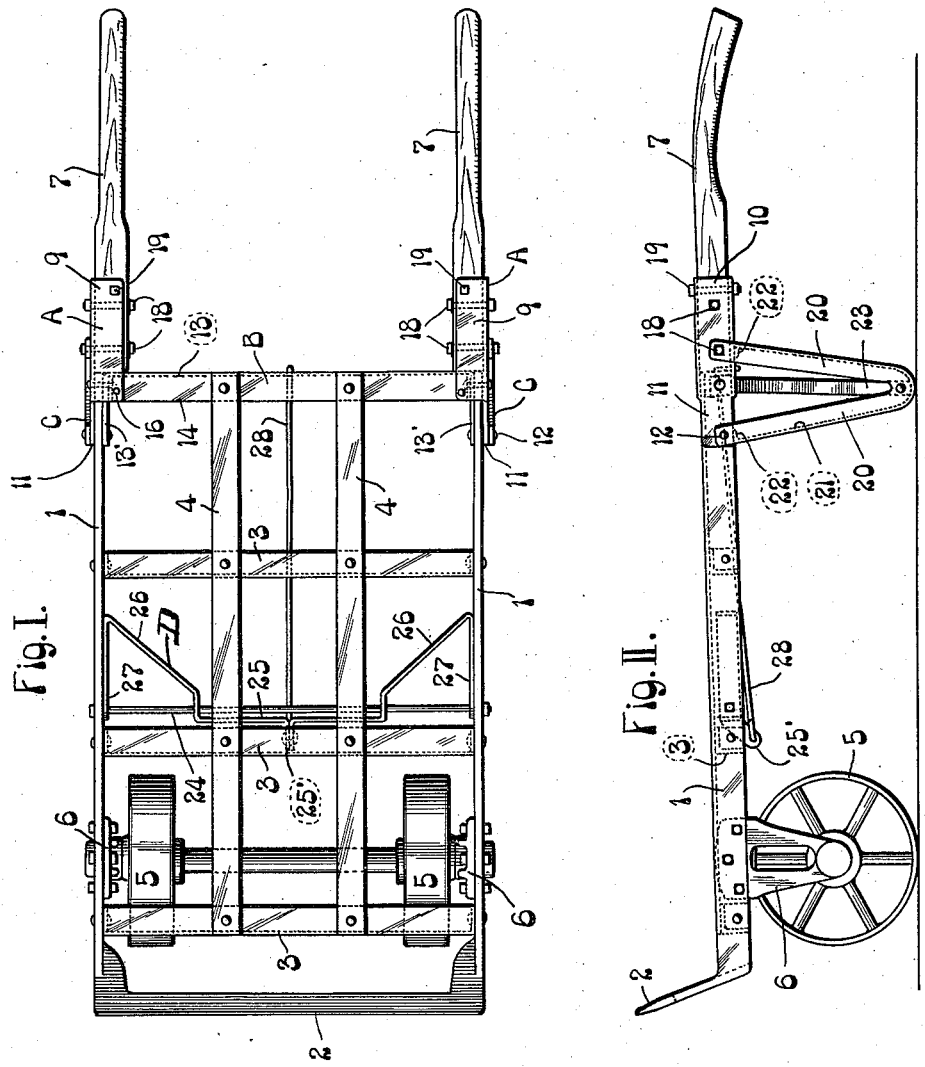

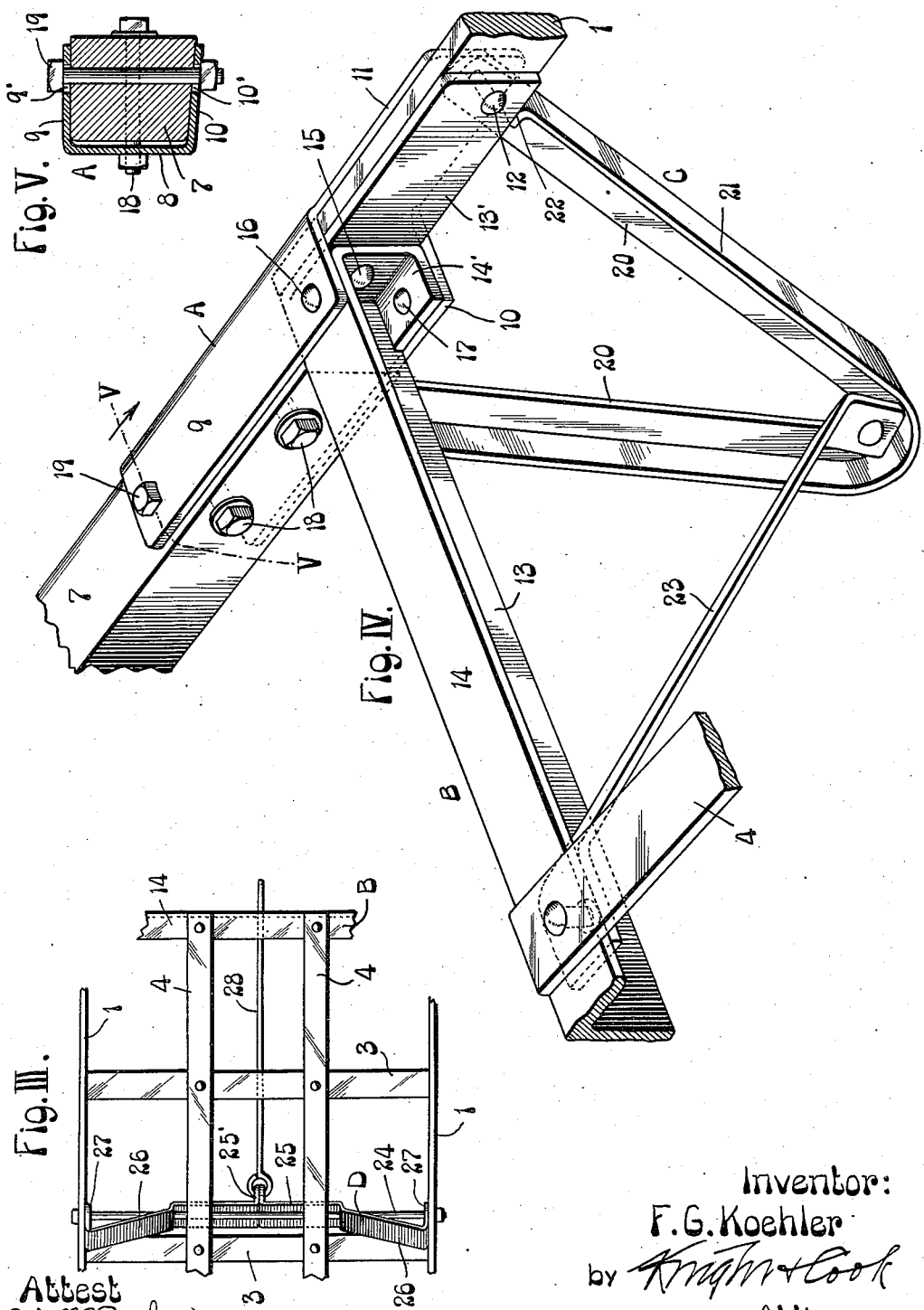

FRANK G. KOEHLER, OF ST. LOUIS, MISSOURI.

HAND-TRUCK.

1,014,400.  Specification of Letters Patent.  Patented Jan. 9, 1912.

Application filed April 24, 1911. Serial No. 623,100.

*To all whom it may concern:*

Be it known that I, FRANK G. KOEHLER, a citizen of the United States of America, and resident of the city of St. Louis and State of Missouri, have invented certain new and useful Improvements in Hand-Trucks, of which the following is a full, clear, and exact description, reference being had to the accompanying drawings, forming part of this specification.

My invention relates to a hand truck and it pertains more particularly to structural features of a truck of this kind involving novel and efficient means for connecting the handles to the truck frame, for clamping the frame side bars to each other at their rear ends adjacent the points of attachment of the handles to the frame, a novel leg structure, and a rack pivotally mounted in the truck frame and adapted to be moved to and from a position in which it is of service in maintaining a barrel upon the truck.

Figure I is a top or plan view of my hand truck. Fig. II is a side elevation of my hand truck. Fig. III is a top or plan view of the central portion of the truck frame with the barrel rack in elevated position. Fig. IV is an enlarged perspective view of a portion of the truck, including one of the handle connections, the rear tie bar connection and one of the truck legs. Fig. V is a cross section taken on line V—V, Fig. IV.

In the accompanying drawings: 1 designates the side bars of the frame of my truck. These side bars are preferably flat in cross-section and arranged on edge, and they support at their forward ends a toe piece 2 that extends transversely of the truck frame, as is usual in hand trucks.

3 are cross bars, preferably of angle shape in cross section by which the forward and central portions of the side bars 1 are joined to each other. The cross bars 3 are surmounted by top strips 4 extending longitudinally of the truck frame and riveted to said cross bars.

The truck frame is supported at its forward end by wheels 5 journaled in bearing box brackets 6 attached to the side bars of the truck frame.

A designates handle socket pieces attached to the truck frame at the rear end of the side bar 1 in a manner to be presently fully set forth and in which the handles 7, preferably of wood, are seated. The rear portion of each handle socket A is of U-shape in cross section and comprises a vertical outer wall 8, a top flange 9, and a bottom flange 10.

11 is a vertically disposed tail arm extending forwardly from the U-shaped portion of the socket piece A. The socket pieces A are so fitted to the side bars of the truck frame as to provide for the U-shaped portions of these socket pieces straddling the rear ends of the side bars while the tail arms extend forwardly along the outer faces of the frame side bars and are secured thereto by rivets or bolts 12. The rear portions of the socket pieces A extending beyond the rear ends of the frame side bars are adapted to receive the handle 7 held therein by means to be hereinafter described.

B designates a transverse tie bar uniting the rear ends of the frame side bars and connected to the socket pieces A in a manner to be presently set forth. This tie bar B is of angle shape in cross section, having a vertical wing 13 at its rear side and a horizontal top wing 14 extending forwardly from the wing 13. The vertical wing 13 of the tie bar is provided with extension arms 13′ that project forwardly at the ends of the wing along the frame side bars 1 and are connected to said frame side bars by the rivets or bolts 12 that serve to connect the socket piece tail arms 11 to the rear ends of the side bars. The horizontal top wing 14 of the tie bar B is provided at its ends with extensions 14′ which extend downwardly from the top flange and abut against the extension arms 13′ and then parallel with the top wing immediately above the bottom flange 10 of the socket piece A. The extension arms 14 are, together with the extension arms 13′ and the socket piece A, secured to the frame side bars 1 by rivets or bolts 15, serving to rigidly connect all of these parts, and they are further rigidly joined to each other by rivets or bolts 16 and 17, the former of which extend through the top flange of the socket piece A and the top wing of the tie bar B, while the latter extend through the horizontal terminal portion of the extension arm 14' and the bottom flange of the socket piece A.

It will be quite apparent that the structural features just described serve to most efficiently connect the side bars 1 and the tie bar B to each other to produce a rigid structure at the rear end of the truck frame and at the same time unite the socket pieces A very strongly to the frame elements.

The handles 7 are seated in the U-shaped socket pieces A so that their forward ends abut against the vertical flange 13 of the transverse tie bar B and they are connected to said socket pieces by horizontal bolts 18 which extend through the handles and the vertical outer walls 8 of the socket pieces, as seen most clearly in Fig. V. In order that the handles may be firmly seated in the U-shaped socket pieces to prevent their play therein, either when the truck is first manufactured or after wear or shrinkage of the handles has taken place, I make the U-shaped socket pieces of tapering shape in cross section and also taper the portion of the handles that enter into these socket pieces. The tapering of the socket pieces may be accomplished by arranging the bottom flange 10 of each socket piece at an angle to the plane of the top flange 9, as seen in Fig. V, and it will be readily perceived that when play occurs between the handles and the socket pieces, it may be readily compensated for by the lateral adjustment of the handles through the medium of the horizontal bolts 18. I further provide, in order that the handles may be tightly clamped within the socket pieces, means for binding the top and bottom flanges of the socket pieces to the handles and which consist of vertical bolts 19 that extend through the top and bottom flanges of the socket pieces of the handles, slots 9' and 10' being located transversely of said flanges to receive said bolts and prevent the lateral movement thereof when the handles are moved transversely through the medium of the horizontal bolts 18.

C designates the legs of my truck. These legs are made of angle iron bent into V-shape, and each leg comprises an outer flange 20 parallel with the frame side bars 1 and an inner flange 21 extending transversely of said side bars. The flanges 21 are cut away from the flanges 20 at the outer ends of the legs and bent downwardly to provide horizontal lips 22 that rest beneath the frame side bars. The upper ends of the flanges 20 are connected to the frame side bars by the rivets or bolts 12, and by the forward bolts 18, to secure the legs to the truck frame while the lips 22, by resting against the bottom edges of the frame side bars, cause the flanges 21 to serve as sustaining members for the truck frame and a load thereon when the truck is loaded and resting on its legs. The legs C are maintained in proper alinement with the sides of the truck frame by braces 23 connecting them to the tie bar 14.

D designates a barrel rack extending transversely of the truck frame and mounted on a transverse pivot rod 24, seated at its ends in the frame side bars. This rack is provided with a central portion 25 located beneath the pivot rod and side members 26 that extend upwardly from the central portion, then laterally, and again downwardly to provide side arms 27. The pivot rod 24 extends through the arms 26, which are adjacent to the central portion 25 and the side arms 27. The said side arms 27 are of such dimensions as to provide for their extending considerably above the plane of the truck frame when the rack D is elevated to the position seen in Fig. III, which is that of which it is of service to receive a barrel resting on the truck and preventing the lateral movement of said barrel. The rack D is moved from its horizontal idle position shown in Figs. I and II to its position of utility by a pull rod 28 connected to an ear 25' depending from the central portion of the rack, which pull rod projects rearwardly to the tie bar B, where it is supported in any suitable manner in any position conveniently accessible for its operation, in order that the barrel rack may be raised and lowered.

I claim:—

1. In a truck, the combination of a frame having side bars, supporting wheels for said frame, U-shaped socket pieces comprising a side wall and top and bottom horizontal flanges, said side wall extending beyond said horizontal flanges and forming a tail arm, said socket pieces being secured to the side bars of said frame by fastening devices passing through the side wall and tail arm of said socket piece and through said bars, and handles set into said socket pieces and secured therein.

2. In a hand truck, a frame comprising side bars, tie bars connecting said side bars, one of the tie bars being an angle bar having vertical and horizontal wings integrally connected together, the vertical wing being bent to lie against the side bars, each end of the horizontal wing being bent to overlap and abut against the vertical wing, and fastening devices passing through the overlapping portions of said wings and connecting them to the side bars.

3. In a hand truck, a frame including side bars, U-shaped socket pieces secured to the ends of said side bars, a tie bar having a vertical wing and a horizontal wing; each end of the horizontal wing being bent to conform to the shape of and lie within one of the socket members, the end portions of the vertical wing being arranged between said side bars and the ends of the horizontal wing, fastening devices passing through both of said wings and connecting them to the side bars, and handles fitted to said socket pieces.

FRANK G. KOEHLER.

In the presence of—
A. J. McCauley,
E. B. Linn.

Copies of this patent may be obtained for five cents each, by addressing the "Commissioner of Patents, Washington, D. C."